INVENTORS
KENNETH J. LAW
BY GORDON R. BROWN

*Donnelly, Mentag & Harrington*

ATTORNEYS

United States Patent Office 3,434,048
Patented Mar. 18, 1969

3,434,048
EDDY CURRENT APPARATUS FOR TESTING THE HARDNESS OF A FERROMAGNETIC MATERIAL
Kenneth J. Law, Southfield, and Gordon R. Brown, Livonia, Mich., assignors to K. J. Law Engineers, Inc., Detroit, Mich., a corporation of Michigan
Filed July 10, 1964, Ser. No. 381,850
U.S. Cl. 324—34                                    5 Claims
Int. Cl. G01r 33/00, 33/02, 33/12

This invention relates to hardness testing and more particularly, to an electronic apparatus for electro-magnetically determining the hardness of a test piece.

Hardness testing by electro-magnetic apparatus is known in the art. Examples of these apparatuses are disclosed in such patents as Irwin Patent 2,945,176. Safferling Patent 2,952,806 and Callan Patent 2,797,386. The prior art devices, however, are subject to numerous disadvantages. For example, the electrical characteristics of the coil employed to induce the flux in the test piece affect the results of the test by influencing the current or voltage which is detected. Further, these devices usually employ an amplitude responsive type test arrangement in which the magnitude of the induced flux is measured to determine the hardness of the test piece. Accordingly, it is an object of this invention to provide an improved hardness testing apparatus.

Another object of this invention is to provide an improved hardness testing apparatus which obviates all of the above mentioned disadvantages.

It is another object of this invention to provide a hardness testing apparatus in which the parameters of the driving coil do not markedly influence the measuring circuit.

Yet another object of this invention is to provide a hardness testing apparatus which is independent of the amplitude of the flux induced in the test piece.

A still further object of this invention is to provide a hardness testing apparatus which is simple and economical in construction and operation and is also highly reliable.

Still another object of this invention is to porvide a hardness testing apparatus which exhibits a linear response and a normally full scale reading of a meter as a basis of comparison between a standard and a test piece to give a highly accurate and reliable indication of the hardness of the test piece.

Briefly, in accordance with aspects of this invention, we provide a hardness testing apparatus with a transducer including a first coil for producing a magnetic flux in a test piece; a second coil coupled to the test piece to determine the amount of flux induced in the test piece; a first current sensing amplifier coupled to the inducing coil; a phase shift network and a voltage crossover switch coupled to the second coil; and, means to compare the outputs of these two coils as to phase to determine the hardness of the test piece. In accordance with other aspects of this invention, we employ a flux producing coil to which an alternating current source is connected and a detection coil coupled to the flux producing coil through a test piece and derive a voltage indicating signal from the second coil, a current indicating signal from the flux producing coil, and a second current indicating signal from the flux producing coil. The voltage signal from the detection coil is fed to a circuit which produces pulses in accordance with the phase shift of the voltage signal and feeds these pulses to a summing junction, which summing junction receives current from the flux producing coil through a switching circuit to deliver a resultant output which is indicative of the sum of the voltage responsive signals and the current responsive signals. Advantageously, a second current responsive signal is derived from the flux producing coil and is employed to generate pulses which are applied to a difference amplifier, which difference amplifier also receives the resultant output signal from the summing junction, and the difference amplifier delivers a signal to a meter indicative of the sum of the voltage responsive signal, the first current responsive signal and the difference between these signals and the second current signal.

In accordance with yet other aspects of this invention we provide a hardness testing apparatus with a flux producing coil, a flux responsive detection coil, a difference amplifier coupled to the flux producing coil to receive a constant reference signal, a current responsive circuit coupled to the flux producing coil and to a summing junction, and a voltage responsive network coupled to the detection coil and to the summing junction. The summing junction is coupled to the difference amplifier and the difference amplifier is coupled to a meter, such that the meter indicates a normal full scale deflection and variations in this full scale deflection will be produced by test pieces placed between the flux producing coil and the detection coil, which test pieces vary in hardness relative to a standard piece, and the apparatus is adjusted such that the standard piece produces a calibrated deflection of the meter. Advantageously, the voltage responsive signal and the current responsive signals are employed to generate pulses of predetermined amplitude when the voltage and current signals cross over the zero reference line such that the system is independent of the amplitude of the voltage responsive and current responsive signals and is responsive only to phase difference of these signals.

These and various other objects and features of the invention will be more clearly understood from a reading of the detailed description of the invention in conjunction with the drawings in which.

Figure 1:
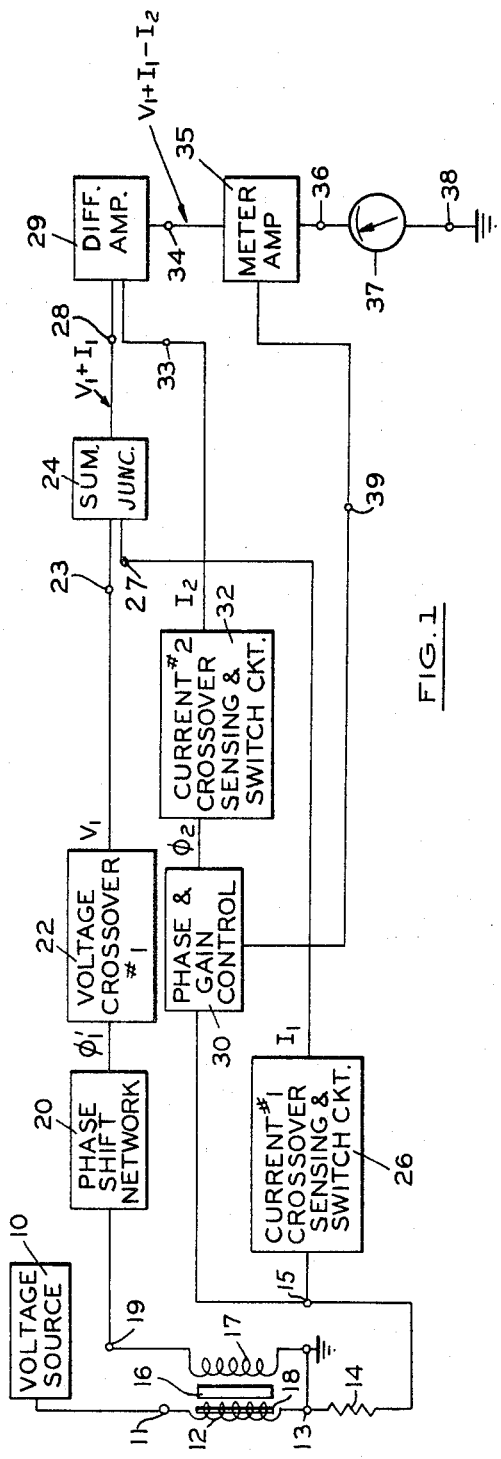
FIG. 1 is a combined schematic and block diagram of one illustrative embodiment of this invention.
Figure 2:
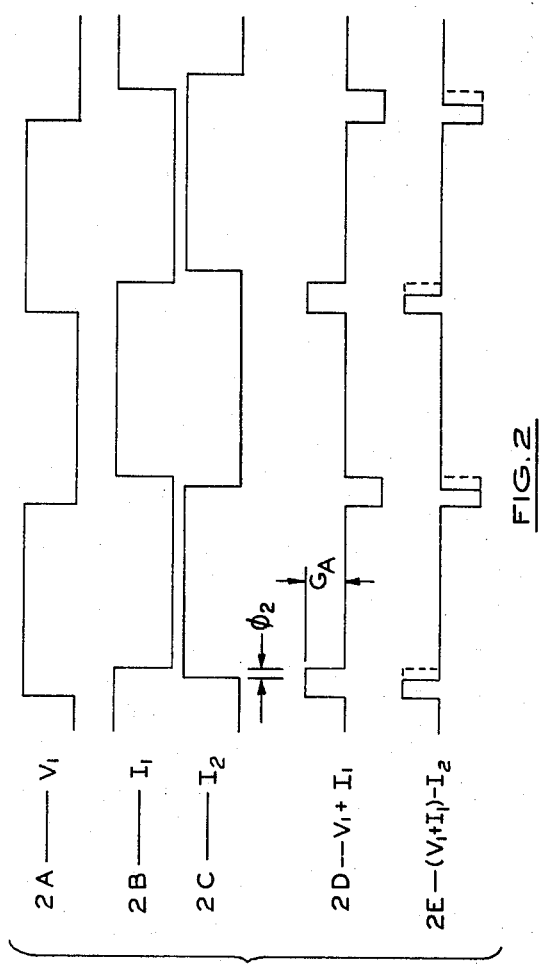
FIGS. 2A through 2E are time plots of wave forms illustrating principles of operation of this invention; and, FIG. 3 is a schematic and block diagram illustration of one illustrative embodiment of this invention.

Referring now to FIG. 1, there is depicted in combined schematic and block diagram form one illustrative embodiment of hardness testing apparatus according to this invention. In this embodiment a voltage source 10 is coupled to a terminal 11 of a flux producing coil 12 and the opposite terminal 13 is coupled to ground. The test piece is indicated as a rectangular ferrous member 16, the hardness of which is to be determined in comparison to a previously tested standard, not shown. Advantageously, a detection coil 17 is coupled to the ground and is electromagnetically coupled to the flux producing coil 12 through the test piece 16. Because of this isolation between the flux producing coil 12 and the detection coil 17, the impedance parameters of the flux producing coil 12 do not affect the flux produced in the measuring circuit or detection coil 17. Stated in another manner, the current which will flow in the detection coil 17 is proportional to the driving voltage induced in the sensing coil 17 which voltage is proportional to the flux induced in the part 16 being tested. Preferably, the flux between detection coil 17 and the flux producing coil 12 is coupled through an intermediate ferrite core 18 which is preferable because it introduces a low hysteresis loss. The ferrite core is required to increase the coupling between the coils 12 and 17, because in many cases the part 16 being tested is not placed within the coils, but is placed near the coils. The ferrite core introduces a lower reluctance flux path to increase coupling to the part 16 being tested without placing the part 16 within the coils 12 and 17. The output of the detection coil 17 is fed from a terminal 19 as a voltage signal, which signal is fed to a phase shift network 20 coupled to the terminal 19. The output of phase shift network 20 is a phase shifted voltage signal, $\phi1$, which signal is fed to a voltage zero crossover circuit 22. The voltage zero crossover circuit 22 is a bi-stable switching circuit which switches from one stable condition to another when the phase shifted signal from the phase shift network 20 passes through the zero reference line. The zero reference line will in most cases be an actual zero amplitude of the function, however, due to small discrepancies in the electronic amplifier this may be adjusted slightly above or below zero due to the unbalance of the amplifiers themselves. The output of the voltage zero crossover circuit 22 is a series of generally rectangular waves indicated by the wave form of FIG. 2A, the phase relation of which with respect to the A.C. signal from the voltage source 10 varies in accordance with the phase shift of the flux induced in the detection coil 17 relative to the inducing flux in coil 12, which phase shift, $\phi1$, is proportional to the hardness of the test piece 16. If there is no test piece 16 between the coils 12 and 17 during a setting up operation the two phase shifts $\phi1$ are the same, however, the second phase shift $\phi1$ is proportional to the hardness of the test piece 16 and it is designated as $\phi1'$ in FIG. 1. These generally rectangular waves or square wave pulses are fed from the voltage zero crossover circuit 22 to an input terminal 23 of a summing junction 24. The term summing circuit is also used in the claims to designate the summing junction 24.

The apparatus includes a bi-stable current zero crossover sensing amplifier and switching circuit 26 having its input connected to the terminal 13 and its output connected to a second input terminal 27 of the summing junction 24. The current fed from the terminal 13 is employed as a switching function which switches the amplifier and switching circuit 26 from one stable state to another when the current passes through its zero reference such that the signal fed from the circuit 26 to the summing junction 24 is a series of rectangular pulses depicted by the wave form 2B. The output of summing junction 24 is a signal 2D indicative of the sum of the voltage signal indicating wave form and the current indicating wave form which output is fed to an input terminal 28 of a difference amplifier 29.

A second current responsive circuit, 30, is coupled to the terminal 13 and this is a bi-stable gain control and phase responsive circuit 30, the output of which is a phase shifted signal controlled in amplitude, which signal is fed to a bi-stable current crossover sensing amplifier and switching circuit 32. The second current responsive system comprising the circuits 30 and 32 adjusts the gain and the sensitivity of the unit for a given differential phase reading between zero and full scale reading on the meter 37, and it sets the upper limit on this meter. The output of the current crossover sensing amplifier and switching circuit 32 is fed to a second input terminal 33 of the difference amplifier 29. The output of the difference amplifier 29 is a signal corresponding to signal 2E which signal is indicative of the difference of the signals $V_1+I_1$ and $I_2$, and designated $(V_1+I_1)-I_2$. The output of difference amplifier 29 is fed through a terminal 34 to a meter amplifier 35 to an input terminal 36 of a meter 37 which is connected to ground at terminal 38. Advantageously, with this arrangement the meter 37 responds to the signal indicated in the wave plot 2E, which is the difference between the signal $V_1+I_1$ from the summing junction 24 and the second current indicating signal $I_2$ applied to the difference amplifier input terminal 33. Advantageously, the meter 37 performs an integrating function which normally reads a full scale reading which is a constant and equal to the product $I_2t$. In the difference amplifier, this product has subtracted from it a signal $(V_1+I_1)t$ such that the scale reading of the meter 37 is diminished by an amount corresponding to the difference in hardness between the test piece and the high limit reference or standard piece. A constant current reference signal is fed from circuit 30 through terminal 39 to meter amplifier 35. A voltage crossover switch is a bi-stable device which switches state as the wave form goes through zero. A current crossover switch is a bi-stable device which changes state between two levels as the current goes through zero.

Figure 3:
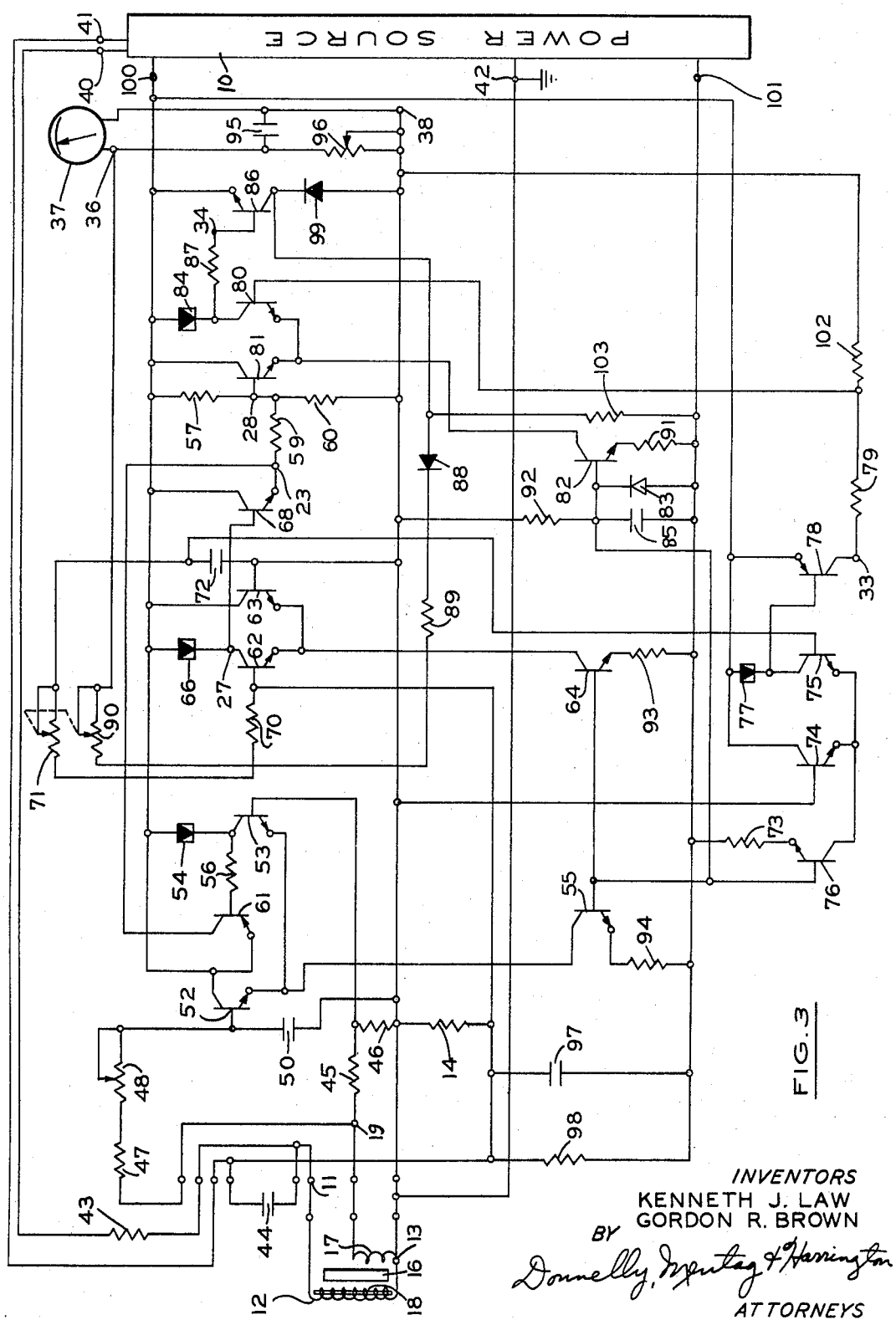

Referring now to FIG. 3, there is depicted in combined block and schematic form, and predominantly in schematic form, one illustrative embodiment of the device illustrated predominantly in block form in FIG. 1. As therein depicted, a power source 10 which in this particular instance includes a 60 cycle alternating current source is connected by way of a pair of terminals 40, 41 to the flux producing coil 12. Connected between terminal 11 of the coil 12 and the terminal 40 is a suitable voltage dropping resistor 43. Terminal 41 is connected to terminal 13 through the resistor 14. A capacitor 44 is connected across the alternating current input of terminals 40, 41 to act as a filter to prevent line transients from reaching the flux producing coil 12. A flux responsive coil 17 is coupled to the flux inducing coil 12 by means of a test piece 16, the hardness of which is to be compared with a previously measured standard, not shown.

The output of the coil 17 is connected or coupled to terminal 19 which is the input terminal of the phase shift network 20 which is indicated in the block diagram of FIG. 1. This network 20 includes resistors 45, 46, 47 and 48 and a capacitor 50. Resistor 48 is variable and is employed to control the amount of phase shift of the network 20 output signal relative to the current in coil 12 in a manner which will be subsequently described in the operation procedure. The output of the phase shifter network 20 is applied to the voltage zero crossover amplifier 22 which includes transistors 52, 53, 61 tunnel diode 54, transistor 55 and resistor 56. Transistor 55 is a constant current source for the voltage amplifier allowing the voltage amplifier to become a clipper to thus deliver a constant amplitude output signal. The output of the amplifier 22 is fed through tunnel diode 54, which tunnel diode increases the rise time of the output pulse. This increased rise time signal is the output of the tunnel diode 54 and is fed to terminal 23 of the summing junction 24 of FIG. 1, which summing junction is composed of resistors 57, 59 and 60. The output of the voltage crossover amplifier transistor 53 is fed through resistor 56 to the base of amplifier transistor 61, the collector of which is connected to the resistor 59.

The current indicating signals $I_1$ and $I_2$ are developed across a resistor 14 indicated in FIG. 1, which resistor is coupled to the terminal 13 of the flux producing coil 12. This current indicating signal across resistor 14 is fed into the first current crossover amplifier 26 composed of transistors 62, 63, 64 and tunnel diode 66. Transistor 64 is a constant current source for this amplifier in a manner similar to transistor 55. The output signal for current crossover sensing amplifier and switching circuit 26 (block diagram of FIG. 1) is fed across and the tunnel diode 66 to increase the rise time of the output pulse. This output signal is fed to the base of transistor 68 and the output of the transistor 68 is fed into the same summing junction including resistors 57, 59 and 60 as the output of tunnel diode 54. Tunnel diode 66 turns on and off as a result of the operation of transistors 62, 63 and the condition of tunnel diode 66 determines the conductivity of a signal to the base of transistor 68 in a manner similar to the cooperation of the tunnel diode 54 and the transistor 61.

The current signal from resistor 14 also passes through a second phase shift network 30 (block diagram of FIG. 1) which is matched to the meter gain control. The second phase shift network is composed of resistors 70, 71 and capacitor 72. Advantageously, resistor 71 is variable to vary the phase of the output signal fed from the phase shift network 30 fed to the second current crossover source amplifier and switch circuit 32 (block diagram of FIG. 1). The circuit 32 is composed of transistors 74, 75 and 76, with transistor 76 acting as a constant current source. The output of this amplifier is fed to the tunnel diode 77 with its driver transistor 78. Transistors 74, 75 are amplifiers which control the stable condition of the tunnel diode 77 and the condition of tunnel diode 77 either turns on or off the transistor 78. G$a$ is an amplitude set by the adjustment of resistor 90. This amplitude is set such that the product of it and the width of the pulse 2D is a constant. This means that G$a$ is an inverse function of the phase width determined by the setting of the variable resistor 71. The product of phase width and G$a$ and 2D is always a constant and determines the full scale of the meter 37. Variable resistors 71 and 90 are preset and are mechanically coupled to insure that this condition always exists.

The output of the circuit 32 is fed from a terminal 33 coupled to the collector electrode of transistor 78 through a resistor 79 to the base of a transistor 80. The transistor 80 and the corresponding transistor 81 define a portion of the difference amplifier 29 (block diagram of FIG. 1), which difference amplifier 29 includes the constant voltage source transistor 82. The first input terminal 28 of the difference amplifier 29 is connected to the base of transistor 81 and terminal 33 is connected to the base of transistor 80.

A Zener diode 83 acts as a voltage reference device to supply a reference voltage to all of the constant current sources defined by transistors 55, 64, 76 and 82. Capacitor 85 acts as a filter capacitor for the constant voltage source of Zener diode 83. The output of the summing junction 24 (block diagram of FIG. 1), including resistors 57, 59 and 60, is connected to the base of transistor 81, which transistor 81 is a portion of the difference amplifier 29 as previously described. The output signal of the difference amplifier 29 is fed into the tunnel diode 84 which increases the rise time of this signal. Tunnel diode 84 drives the meter amplifier transistor 86 through a suitable resistor 87. Tunnel diodes 54, 66, 77 and 84 are bi-stable devices which are either conducting or non-conducting in a manner well known in the art.

The conductivity or the stable condition of the respective diodes is determined by the respective transistor amplifiers to which they are connected. For example, the conductivity of tunnel diode 54 is controlled by transistors 52, 53 and depending upon the condition of the tunnel diode 54, the condition of conductivity of transistor 61 is determined. If the tunnel diode 54 is conducting, then it by-passes the signal from the transistors 53 such that the signal cannot reach the base of the transistor 61. If the tunnel diode 54 is nonconducting, then the signal from the transistor 53 flows through the collector electrode, resistor 56, to the base of the transistor 61 and the transistor 61 becomes conducting to deliver an output signal to the resistor 59 in a manner well known in the art. Transistor amplifiers 80, 81 determine the condition of conductivity of the bi-stable tunnel diode 84 and the condition of the tunnel diode 84 determines the conductivity of the transistor 86.

The output of the meter amplifier 35, previously mentioned and shown in FIG. 1, is fed from the transistor 86 and is applied across a resistor 103 and fed through a diode 88, a resistor 89, and a variable resistor 90 to the terminal 36 of the meter 37. Diodes 88 and 99 de-couple the meter 37 from the leakage current of transistor 86 such that only the intended signals will reach the meter 37. Resistor 102 is part of the bias network for transistor 80, which bias network includes the resistor 79 and determines the amount of current fed to the base of transistor 80 from the transistor 78 by way of the terminal 33. The meter 37 also includes a terminal 38 which is connected to one terminal of a capacitor 95, the other terminal of the capacitor 95 being connected to the meter terminal 36. The variable resistor 96 is connected in parallel with the integrating capacitor 95 to adjust the full scale reading or to adjust the current through the meter 37 for full scale reading. Resistors 91, 92, 93 and 94 constitute a bias network for the constant current source transistors 55, 64 and 82. Capacitor 97 and resistor 98 constitute a bias network and filter arrangement for the transistors 62, 63.

Terminals 40, 41 are supplied with alternating current power from source 10 and terminal 42 acts as as common ground for the system, including the power source 10. The terminals 100, 101 are supplied with direct current, closely regulated power for the purpose of energizing the transistors and the diodes in a manner well known in the art.

OPERATION

In normal operation, the equipment is first adjusted for a zero or low limit or left hand reading on the meter 37 by adjusting the phase shift network 20 (FIG. 1) for zero phase shift and the corresponding zero meter reading. This is accomplished by adjusting resistor 48 (FIG. 3). The first adjustment may be made with no part 16 present, or with an unhardened part 16, or with a part 16 selected as a minimum acceptable hard part. A second adjustment is required to set the full scale or right hand reading on meter 37. This is accomplished by adjusting the mechanically coupled variable resistors 71 and 90 (FIG. 3) to adjust network 30 (FIG. 1). A part 16 is used for this second adjustment which has been selected as the hardest acceptable part. These two adjustments calibrate the equipment and unknown parts 16 tested thereafter will create readings on the meter 37 which indicate their relative position between the two known hardness limits. If no part 16 is present between the coils 12 and 17, or a part 16 softer than the lower limit is tested, the indicator for meter 37 will remain at its lower limit, and parts so tested are rejected. Parts 16 which are too hard cause the indicator for the meter 37 to remain at its full scale reading and these parts are rejected. For production testing the scale of meter 37 can be graduated in any standard hardness scale, as for example, 58 to 62 Rockwell "C."

While we have shown and described one illustrative embodiment of this invention, it is understood that the concepts thereof may be employed in other embodiments without departing from the spirit and scope of this invention.

What is claimed is:

1. In a magnetic hardness testing apparatus for testing the hardness of a test piece, the combination comprising:
   (a) an alternating current source;
   (b) a flux producing coil coupled to said source;
   (c) a detection coil coupled magnetically to said test piece, and test piece being coupled magnetically to said flux producing coil;
   (d) means connected to said flux producing coil for generating a first signal indicative of the zero reference crossover of the current through said flux producing coil;
   (e) means connected to said flux producing coil for producing a second signal indicative of the zero reference crossover of the current through said flux producing coil and phase shift means coupled to said last mentioned means to provide a predetermined phase shift of said second signal;
   (f) means connected to said detection coil for producing a third signal indicative of the zero reference crossover of the voltage produced by the flux induced in said detection coil; and,
   (g) means connected to said first signal generating means and said third signal producing means for comparing said first and said third signals to produce a comparison signal and means connected to said comparing means and said second signal producing means for comparing said comparison signal with said second signal including a meter for giving a visual indication of the result of the combination of said signals.

2. In a hardness testing apparatus for testing the hardness of a test piece, the combination comprising:
   (a) an alternating current source;

(b) a flux producing coil coupled to said source;
(c) a flux responsive coil coupled to said flux producing coil;
(d) means connected to said flux producing coil for generating a first signal indicative of the zero reference crossover of the current flowing through said flux producing coil and switching in response thereto;
(e) means connected to said flux producing coil for generating a second signal therefrom including a phase control circuit and a second current crossover sensing and switching circuit;
(f) means connected to said flux responsive coil for generating a third signal including a phase shift network and a circuit responsive to the crossover of voltage resulting from the induced flux;
(g) means connected to said first and third signal generating means for comparing said first and said third signals to deliver a resultant signal therefrom; and,
(h) means connected to said signal comparing means and said second signal generating means for comparing said resultant signal with said second signal and means connected to the last mentioned comparing means for indicating the resultant of said last mentioned comparison, which resultant constitutes a hardness indication of a test piece electro-magnetically coupled between said flux producing coil and said flux responsive coil.

3. A hardness testing apparatus for testing the hardness of a test piece comprising:
(a) a flux producing means;
(b) a flux responsive means coupled to said flux producing means through a test piece, the hardness of which is to be tested;
(c) a phase shift network coupled to the output of said flux responsive means;
(d) a semi-conductor switch and a first bi-stable device coupled to said phase shift network;
(e) a summing circuit coupled to the output of said first bi-stable device;
(f) a bi-stable switching circuit coupled to said flux producing means and to said summing circuit;
(g) a semi-conductor difference amplifier coupled to said summing circuit;
(h) a second bi-stable switching circuit coupled to said different amplifier;
(i) a phase shift network coupled to said flux producing means and to said second bi-stable switching circuit; and,
(j) a meter means coupled to said last mentioned phase shift network and to said difference amplifier.

4. The combination according to claim 3 wherein:
(a) said bi-stable device is a tunnel diode.

5. In an electronic hardness tester for determining the hardness of a test piece, the combination comprising:
(a) a voltage source;
(b) inductance means coupled to said voltage source for inducing a flux in said test piece and for responding to the phase shift of the resultant flux induced therein;
(c) a phase shift network coupled to said inductance means;
(d) a zero voltage crossover sensing and switching circuit coupled to the output of said phase shift network;
(e) a summing circuit having one input coupled to the output of said zero voltage crossover sensing and switching circuit;
(f) a phase control network connected to said inductance means;
(g) a first zero current crossover detection and switching circuit coupled to the output of said phase control network;
(h) a difference amplifier having one input terminal coupled to the output of said summing circuit and one input connected to said first zero current crossover detection and switching circuit;
(i) a second zero current crossover detection and switching circuit coupled to said inductance means and to one of the input terminals of said summing circuit; and,
(j) meter means coupled to the output of said difference amplifier for giving a visual indication of the output thereof.

References Cited
UNITED STATES PATENTS 2,945,176   7/1960   Irwin _____ 324—40

RUDOLPH V. ROLINEC, *Primary Examiner.*

R. J. CORCORAN, *Assistant Examiner.*